United States Patent [19]

McKay

[11] 4,193,891
[45] Mar. 18, 1980

[54] PASSIVATION OF METALS ON CRACKING CATALYST WITH AN ANTIMONY THIOCARBAMATE

[75] Inventor: Dwight L. McKay, Bartlesville, Okla.

[73] Assignee: Phillips Petroleum Company, Bartlesville, Okla.

[21] Appl. No.: 926,693

[22] Filed: Jul. 25, 1978

[51] Int. Cl.$^2$ .................. C10G 11/06; C10G 9/16; C07F 9/90; B01J 23/18
[52] U.S. Cl. .................. 252/411 R; 208/48 AA; 208/52 CT; 208/119; 252/430; 252/431 N; 252/439; 252/456; 260/446
[58] Field of Search .................. 260/446, 448.2 R; 252/414–418, 439, 449, 455 Z, 456, 464, 411 R; 208/113, 119, 120, 48 AA, 52 CT

[56] References Cited

U.S. PATENT DOCUMENTS

| | | | |
|---|---|---|---|
| 2,129,693 | 9/1938 | Houdry | 208/119 |
| 3,506,567 | 4/1970 | Barger et al. | 208/89 |
| 3,711,422 | 1/1973 | Johnson et al. | 252/414 |
| 3,979,472 | 9/1976 | Butter | 260/668 R |
| 4,025,458 | 5/1977 | McKay | 252/416 |
| 4,031,002 | 6/1977 | McKay | 208/113 |
| 4,036,740 | 7/1977 | Readal et al. | 208/120 |
| 4,111,845 | 9/1978 | McKay | 208/120 |

*Primary Examiner*—Delbert E. Gantz
*Assistant Examiner*—G. E. Schmitkons

[57] ABSTRACT

A hydrocarbon cracking catalyst is treated with an antimony thiocarbamate to passivate thereon contaminating metals, e.g., vanadium, iron and/or nickel. Used or unused catalyst can be treated.

15 Claims, No Drawings

PASSIVATION OF METALS ON CRACKING CATALYST WITH AN ANTIMONY THIOCARBAMATE

This invention relates to cracking of a hydrocarbon. In one of its aspects it relates to passivating a contaminating metal on a hydrocarbon cracking catalyst. In another of its aspects the invention relates to a process of cracking a hydrocarbon, e.g., a hydrocarbon oil, with a catalyst which has been treated to passivate a contaminating metal whenever it appears thereon.

In one of its concepts the invention provides a catalyst composition which has been treated by addition of an antimony thiocarbamate thereto. In another of its concepts the invention provides a method for passivating a contaminating metal, e.g., vanadium, iron and/or nickel, on a catalyst by adding an antimony thiocarbamate to said catalyst, whether used or unused. In a further concept of the invention it provides a catalytic cracking operation suited for the beneficiation of a hydrocarbon, e.g., a hydrocarbon oil, which comprises contacting the catalyst, used or unused, with an antimony thiocarbamate.

Cracking catalysts, when used to crack oil that contains metals, e.g., vanadium, iron and nickel, accumulate a deposit of these metals. This decreases the yield of gasoline and increases the yield of hydrogen and coke. As known, hydrocarbon feedstock containing higher molecular weight hydrocarbons is cracked by contacting it at an elevated temperature with a cracking catalyst to produce light distillates such as gasoline. The cracking catalyst gradually deteriorates during the cracking operation. A reason for this deterioration is the deposition of contaminating metals such as vanadium, iron and/or nickel on the catalyst. This results in the earlier mentioned disadvantages and also, usually, in a decreased conversion of the hydrocarbon into gasoline.

When the very large amounts of hydrocarbon processed, the high percentage of oil needs of our Country which are now imported and the potential shortage of oil in the world are considered, it is seen that any improvement in the affected results of catalytic cracking of hydrocarbon can be significant. Therefore, there is a need for a cracking process which will prevent or at least reduce significantly at least some of the deleterious effects of the above-mentioned metal contaminants.

U.S. Pat. No. 3,711,422, Marvin M. Johnson and Donald C. Tabler, Jan. 16, 1973, discloses and claims restoring the activity of a cracking catalyst with a compound of antimony, e.g., antimony triphenyl. U.S. Pat. Nos. 4,025,458, May 24, 1977, and 4,031,002, June 21, 1977, Dwight L. McKay, disclose and claim passivating metals on cracking catalyst with antimony compounds which are phosphorodithioates, as described in the patents.

It is an object of this invention to passivate a contaminating metal on a cracking catalyst. It is another object of this invention to provide a catalyst which has been treated to passivate a contaminating metal, e.g., vanadium, iron and/or nickel, thereon whenever it appears on said catalyst. It is a further object of the invention to provide a hydrocarbon cracking operation in which metals tending to contaminate catalyst, thereby reducing its effectiveness or efficiency, are passivated. It is a further object of the invention to provide a method for passivating a metal on a cracking catalyst which contaminates the same whenever it is contaminating the same.

Other aspects, concepts, objects and the several advantages of the invention are apparent from a study of the disclosure and the appended claims.

According to the present invention contaminating metals, e.g., vanadium, iron and/or nickel, deposited on a catalyst, e.g., a cracking catalyst, suitable for cracking hydrocarbon, e.g., hydrocarbon oil, are passivated thereon whenever they appear by treating the catalyst to add thereto an antimony thiocarbamate.

The catalyst treated can be a used or unused one.

Also, according to the invention, there is provided a method for treating a catalyst suitable for hydrocarbon conversion which comprises adding to said catalyst an antimony thiocarbamate.

Still further according to the invention, there is provided a catalytic cracking operation suitable for cracking a hydrocarbon oil which comprises applying to the catalyst, used or unused, an antimony thiocarbamate.

When the catalyst is an unused cracking catalyst it is treated with the antimony thiocarbamate to reduce its susceptibility to the deleterious effects of later-deposited contaminating metal: vanadium, iron and/or nickel.

It has been demonstrated that in a process for cracking gas oil or topped crude oil containing metal contaminants that a metals-contaminated cracking catalyst to which antimony has been added in the form of antimony tris(dipropyldithiocarbamate) provides more gasoline, less coke, and less hydrogen than a comparable catalyst to which no antimony has been added. Indeed, such treatment of the catalyst provides even more gasoline than the comparable catalyst to which antimony has been added in the form of antimony tris(O,O-dipropyl phosphorodithioate).

The cracking catalyst which is contacted with the antimony thiocarbamate can be any of those which are conventionally employed in the cracking of hydrocarbons boiling above about 400° F. (204° C.) for the production of gasolines, motor fuel blending components and light distillates. These catalysts generally contain silica or silica-alumina, such materials frequently being associated with zeolitic materials. These zeolitic materials can be naturally occurring, or they can be produced by conventional ion exchange methods so as to provide metallic ions which improve the activity of the catalyst. Rare earth metals, including cerium, are frequently used for this purpose. Zeolite-modified silica-alumina catalysts are particularly applicable. Examples of cracking catalysts into or onto which the antimony thiocarbamate can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion or ion capable of conversion to a hydrogen ion. If desired, the cracking catalyst can contain a combustion promoter such as platinum or chromium.

Antimony thiocarbamates which can be employed in this invention can be represented by the formula $(R_2NCX_2)_3Sb$, wherein each R is selected from the group consisting of hydrogen and monovalent hydrocarbyl radicals selected from the group consisting of alkyl, cycloalkyl, and aryl, and combinations thereof such as alkaryl, aralkyl, and the like, the number of carbon atoms in each monovalent hydrocarbyl radical being within the range of 1 to about 18, and each X is selected from the group consisting of oxygen and sulfur, at least one X being sulfur.

Examples of some antimony thiocarbamates which can be used in this invention include antimony tris(thiocarbamate), antimony tris(dithiocarbamate), antimony tris(methylthiocarbamate), antimony tris(methyldithiocarbamate, antimony tris(dimethylthiocarbamate), antimony tris(diethyldithiocarbamate), antimony tris(dipropyldithiocarbamate, antimony tris(diisobutylthiocarbamate), antimony tris(hexyldithiocarbamate), antimony tris[bis(2-ethyloctyl)thiocarbamate], antimony tris(dioctadecyldithiocarbamate), antimony tris(dicyclohexyldithiocarbamate), antimony tris[bis(3-methylcyclohexyl)thiocarbamate], antimony tris[(cyclopentylmethyl)dithiocarbamate], antimony tris(diphenyldithiocarbamate), antimony tris(di-p-tolyldithiocarbamate), antimony tris(benzylthiocarbamate), antimony tris(butylphenyldithiocarbamate), antimony tris(dodecylcyclohexylthiocarbamate), and the like, and mixtures thereof. Antimony tris(dipropyldithiocarbamate) is the antimony thiocarbamate presently preferred.

The manner in which the conventional cracking catalyst is contacted with the antimony thiocarbamate is not critical. For example, the antimony thiocarbamate in finely divided form can be mixed with the conventional cracking catalyst in ordinary manner such as by rolling, shaking, stirring or the like. Alternatively, the antimony thiocarbamate can be dissolved or dispersed in a suitable liquid, e.g., water or hydrocarbon, and the resulting solution or dispersion can be used to impregnate the conventional cracking catalyst, followed by volatilization of the liquid. If desired, the antimony thiocarbamate can be dissolved or dispersed in the hydrocarbon feedstock to the cracking process, in which instance the hydrocarbon feedstock and the antimony thiocarbamate contact the cracking catalyst at about the same time.

Although the ratio of antimony thiocarbamate to conventional cracking catalyst can vary over a wide range, depending in part on the concentration of contaminating metals in the catalyst and in the hydrocarbon feedstock to be cracked, the antimony thiocarbamate generally will be used in an amount such as to provide within the range of about 0.002 to about 5, preferably about 0.01 to about 1.5, parts by weight antimony per 100 parts by weight conventional cracking catalyst, i.e., including any contaminating metals in the catalyst but excluding the antimony thiocarbamate.

The cracking process in which the antimony-containing cracking catalyst is employed is basically an improvement over a conventional cracking process which employs a conventional cracking catalyst. Although the antimony-containing cracking catalyst can be employed in a catalytic cracking process employing a fixed catalyst bed, it is especially useful in a fluid catalytic cracking process.

A preferred embodiment of the cracking process of this invention utilizes a cyclic flow of catalyst from a cracking zone to a regeneration zone. In this process, a hydrocarbon feedstock containing contaminating metals, such as vanadium, iron and/or nickel, is contacted in a cracking zone under cracking conditions and in the absence of added hydrogen with an antimony-containing cracking catalyst produced by use of an antimony thiocarbamate as described above; a cracked product is obtained and recovered; the cracking catalyst is passed from the cracking zone into a regeneration zone; and in the regeneration zone the cracking catalyst is regenerated by contacting the cracking catalyst with a free oxygen-containing gas, preferably air. The coke that has been built up during the cracking process is thereby at least partially burned off the catalyst. The regenerated cracking catalyst is reintroduced into the cracking zone.

Furthermore, it is preferred in carrying out the cracking process of this invention to replace a fraction of the total cracking catalyst by unused cracking catalyst continuously or intermittently. Generally, about 0.5 to about 6 weight percent of the total cracking catalyst is replaced daily by a fresh cracking catalyst. The actual quantity of the catalyst replaced depends in part upon the nature of the feedstock used. The makeup quantity of cracking catalyst can be added at any location in the process. Preferably, however, the cracking catalyst that is makeup catalyst is introduced into the regenerator in a cyclic cracking process.

Also, it is to be understood that the used cracking catalyst coming from the cracking zone, before introduction into the regenerator, is stripped of essentially all entrained liquid or gaseous hydrocarbons. Similarly, the regenerated catalyst can be stripped of any entrained oxygen before it reenters the cracking zone. The stripping is generally doen with steam.

The specific conditions in the cracking zone and in the regeneration zone depend upon several parameters such as the feedstock used, the catalyst used, and the results desired. Preferably and most commonly, the cracking and regeneration conditions are or will be within the following ranges:

| Cracking Zone: | |
|---|---|
| Temperature: | 800° F. to 1200° F. (427° C. to 649° C.) |
| Time: | 1–40 seconds |
| Pressure: | Subatmospheric to 3,000 psig |
| Catalyst:Oil Ratio: | 3:1 to 30:1, by weight |
| Regeneration Zone: | |
| Temperature: | 1000° F. to 1500° F. (538° C. to 816° C.) |
| Time: | 2–70 minutes |
| Pressure: | Subatmospheric to 3,000 psig |
| Air@60° F. (16° C.) and 1 atm: | 100–250 ft$^3$/lb coke (6.2–15.6 m$^3$/kg coke) |

The feedstocks employed in the catalytic cracking process of this invention contain metal contaminants such as nickel, vanadium, and iron. The feedstocks include those which are conventionally utilized in catalytic cracking processes to produce gasoline and light distillate fractions from heavier hydrocarbon feedstocks. The feedstocks have an initial boiling point above about 400° F. (204° C.) and include fluids such as gas oils, fuel oils, topped crudes, shale oils, oils from tar sands, oils from coal, mixtures of two or more of these, and the like. By "topped crude" is meant those oils which are obtained as the bottoms of a conventional crude oil fractionator. Such topped crudes are crudes from which the lighter and readily distillable portions have been removed, or even a vacuum-reduced crude oil. If desired, all or a portion of the feedstock can constitute an oil from which a portion of the metal content previously has been removed, e.g., by hydrotreating or solvent extraction.

Typically the feedstock utilized in the process of this invention will contain one or more of the metals nickel, vanadium and iron within the ranges shown in Table I.

Table I

| Metal | Metal Content of Feedstock, ppm[1] |
|---|---|
| Nickel | 0.02 to 100 |
| Vanadium | 0.02 to 500 |
| Iron | 0.02 to 500 |
| Total metals | 0.2 to 1100[2] |

[1]The ppm metal content refers to the feedstock as used.
[2]Total metals in this table and elsewhere refers to the sum of the nickel, vanadium, and iron contents in the feedstock that are effective in contaminating the catalyst; the total metals content can be determined in accordance with methods well known in the art, e.g., by atomic absorption spectroscopy.

One of the most important embodiments of this invention resides in a heavy oil cracking process. The known commercial heavy oil cracking process is capable of cracking heavy oils having a metals content of up to 80 ppm of total effective metals, i.e., metals in any form detrimental to the cracking process. Economically marginal results are obtained with oils having 40 to 80 ppm of total effective metals. In accordance with this invention, heavy oils with a total metals content of about 40 to 100 ppm and even those of about 100 to 200 ppm and above of total metals can be cracked in a cracking process in the absence of added hydrogen by utilizing the cracking catalyst defined above to yield gasoline and other fuels and fuel blending components. Thus, known heavy oils with total metals contents from 80 to 300 ppm that heretofore could not be directly used for fuel production and in particular for gasoline production in accordance with this invention can be cracked to yield gasoline and other fuel blending components. Most preferably the concentration of antimony in the antimony-containing cracking catalyst used in the process of this invention for cracking these heavily metal-loaded oils is related to the average total effective metals content of the feedstock as shown in Table II.

Table II

| Total Effective Metals in Feedstock, ppm | Antimony Concentration in Catalyst, Weight %[1] |
|---|---|
| 40–100 | 0.05–0.8 |
| 100–200 | 0.1–1 |
| 200–300 | 0.15–1.5 |
| 300–800 | 0.2–2 |

[1]Based on weight of catalyst prior to addition of antimony thiocarbamate.

EXAMPLE I

A commercial cracking catalyst comprising amorphous silica-alumina associated with zeolitic material, which had been used in a commerical cracking unit and subsequently subjected to regeneration in the laboratory, was employed in fluidized bed cracking tests which demonstrated the value of using antimony tris(dipropyldithiocarbamate) in improving a cracking catalyst contaminated with metals detrimental to a cracking process, for the cracking of metals-contaminated topped crude oil. Properties of the used cracking catalyst prior to regeneration in the laboratory are shown in Table III.

Table III

| | |
|---|---|
| Surface area, m²/g | 74.3 |
| Pore volume, ml/g | 0.29 |
| Elemental analysis, weight % | |
| Aluminum | 21.7 |
| Silicon | 24.6 |
| Nickel | 0.38 |
| Vanadium | 0.60 |
| Iron | 0.90 |
| Cerium | 0.40 |
| Sodium | 0.39 |
| Carbon | 0.06 |

The used commercial cracking catalyst having the properties shown in Table III was then subjected to regeneration in the laboratory by heating the catalyst while fluidized with air to 1200° F. (649° C.) and maintaining it at that temperature for about 30 minutes while fluidized with air. The catalyst was then cooled to room temperature (about 25° C.) while fluidized with nitrogen, and the resulting catalyst, herein designated as catalyst 0-1, was employed as shown below.

A portion of catalyst 0-1 was used in the preparation of a composition containing 0.1 part by weight antimony per 100 parts by weight catalyst 0-1, the antimony being employed as antimony tris(dipropyldithiocarbamate). In the preparation of this composition, 16.0 g of a mixture of mineral oil and antimony tris(dipropyldithiocarbamate), the antimony concentration of the mixture being 13.8 weight percent, including the antimony present in the small amount of solid phase, essentially antimony oxide, which made up about 0.38 weight percent of the mixture, was mixed with 75 g cyclohexane, and a 2.10-g portion of the resulting composition was mixed with 55 ml cyclohexane. The mixture thus produced was then stirred into 50 g of catalyst 0-1 to give a brown slurry which was dried on a hot plate at 500° F. (260° C.), with stirring, to a fine powder. This powder was transferred to a quartz reactor and heated to 900° F. (482° C.) as a bed fluidized with nitrogen, then heated to 1200° F. (649° C.) while fluidized with hydrogen, then purged with nitrogen for 5 minutes, and then purged with air for 15 minutes. The resulting catalyst composition was then preaged by processing it through ten reducing-oxidizing cycles wherein in each cycle the catalyst composition was cooled from 1200° F. (649° C.) to about 900° F. (482° C.) during 0.5 minute while fluidized with air, then maintained at 900° F. (482° C.) for 1 minute while fluidized with nitrogen, then heated to 1200° F. (649° C.) during 2 minutes while fluidized with hydrogen, then maintained at 1200° F. (649° C.) for 10 minutes while fluidized with air. The catalyst composition was then cooled to room temperature (about 25° C.) while fluidized with nitrogen. The resulting catalyst is herein designated as catalyst AT-1.

A second portion of catalyst 0-1 was used in the preparation of a composition containing 0.10 part by weight antimony per 100 parts by weight catalyst 0-1, the antimony being employed as antimony tris(O,O-dipropyl phosphorodithioate). In this preparation catalyst 0-1, after being dried in a fluid bed at 900° F. (482° C.), was mixed with the calculated amount of a cyclohexane-mineral oil solution of antimony tris(O,O-dipropyl phosphorodithioate) containing 0.0147 g antimony per ml solution. The treated catalyst was then heated to apparent dryness, after which the dried catalyst composition was transferred to a quartz reactor and heated to 900° F. (482° C.) as a bed fluidized with nitrogen, followed by regeneration at 1100° F. (593° C.) while fluidized with air. The catalyst composition was then preaged by processing it through ten cracking-regeneration cycles as a confined fluid bed in a quartz reactor using toppd West Texas crude oil as feed. Each cycle consisted of a nominal 0.5-minute oil feed time to the catalyst fluidized with nitrogen during the cracking step conducted at about 950° F. (510° C.), followed by stripping of hydrocarbons from the system by fluidization of the catalyst for 3 to 5 minutes with nitrogen, followed by regeneration of the catalyst while heating to about 1200° F. (649° C.) for abour 1 hour while fluidized with air. The catalyst was then cooled to room temperature (about 25° C.) while fluidized with nitrogen to provide a catalyst herein designated as catalyst ATDP-1.

Although the procedures used in the preparation of catalysts 0-1, ATDP-1, and AT-1 included some variations other than the use or lack of use of a particular modifying agent comprising antimony, these other variations were not such as would be expected to have a significant effect on the results obtained in the subsequent evaluation of the catalysts in cracking tests.

Catalysts 0-1, ATDP-1, and AT-1 were evaluated in three series of cracking-regeneration cycles, in which the cracking step was conducted over a range of catalyst:oil ratios, using approximately 35 g of catalyst as a confined fluid bed in a quartz reactor and employing topped West Texas crude oil as the feedstock in the cracking step. In each cycle the cracking step was carried out at 940° F. (510° C.) and about atmospheric pressure for 0.5 minute, and the regeneration step was conducted at about 1200° F. (649° C.) and about atmospheric pressure for approximately 1 hour using fluidizing air, the reactor being purged with nitrogen before and after each cracking step.

Properties of the topped West Texas crude oil used in this Example are shown in Table IV.

Table IV

| | |
|---|---|
| API gravity @ 60° F. (16° C.)[1] | 21.4 |
| Distillation, °F. (°C.)[2] | |
| IBP | 556 (291) |
| 10% | 803 (428) |
| 20% | 875 (468) |
| 30% | 929 (498) |
| 40% | 982 (528) |
| 50% | 1031 (555) |
| Carbon residue, Rams, wt %[3] | 5.5 |
| Elemental analysis | |
| S, wt % | 1.2 |
| Ni, ppm | 5.24 |
| V, ppm | 5.29 |
| Fe, ppm | 29 |
| Pour point, °F. (°C.)[4] | 63 (17) |
| Kinematic viscosity, cSt[5] | |
| @ 180° F. (82° C.) | 56.5 |
| @ 210° F. (99° C.) | 32.1 |
| Refractive index @ 67° C.[6] | 1.5 |

[1]ASTM D 287-67
[2]ASTM D 1160-61
[3]ASTM D 524-64
[4]ASTM D 97-66
[5]ASTM D 445-65
[6]ASTM D 1747-62

Typical results of the cracking tests are summarized in Table V. The catalyst:oil weight ratios and yields of gasoline, coke, and hydrogen at a feed conversion level of 75 volume percent were determined graphically from curves which were drawn to represent values for conversion and yields as determined experimentally at the various catalyst:oil ratios employed.

Thus, in the cracking of topped crude oil using a fluidized catalyst bed, at the same feed conversion level, the catalyst prepared by use of antimony tris(dipropyldithiocarbamate), when compared with the catalyst prepared by use of antimony tris(O,O-dipropyl phosphorodithioate), provided a higher gasoline yield and gave acceptably low levels of coke and hydrogen which were lower than those obtained with the catalyst to which no antimony had been added, at the same time exhibiting satisfactory catalyst activity.

EXAMPLE II

Another commercial cracking catalyst comprising amorphous silica-alumina associated with zeolitic material, which had been used in a commercial cracking unit and subsequently subjected to regeneration in the laboratory, was employed in fixed bed cracking tests which demonstrated the value of using antimony tris(dipropyldithiocarbamate) in improving a cracking catalyst contaminated with metals detrimental to a cracking process, for the cracking of metals-contaminated gas oil. Properties of the used cracking catalyst prior to regeneration in the laboratory are shown in Table VI.

Table VI

| | |
|---|---|
| Surface area, m²/g | 65.4 |
| Pore volume, ml/g | 0.37 |
| Elemental analysis, weight % | |
| Nickel | 0.32 |
| Vanadium | 0.44 |
| Iron | 1.1 |
| Cerium | 0.52 |
| Carbon | 0.15 |

The used commercial cracking catalyst having the properties shown in Table VI was then subjected to regeneration in the laboratory by heating the catalyst while fluidized with air to 1200° F. (649° C.) and then maintaining it at that temperature for about 30 minutes while fluidized with air. The catalyst was then cooled to room temperature (about 25° C.) while fluidized with nitrogen, and the resulting catalyst, herein designated as catalyst 0-2, was employed as shown below.

Approximately 4 g of catalyst 0-2, as a fixed bed in a quartz reactor, was heated at 1150° F. (621° C.) for 1 hour in a stream of air and then at 900° F. (482° C.) for 30 minutes in a stream of air. The catalyst was then cooled to room temperature (about 25° C.) in a stream of nitrogen. The resulting catalyst is herein designated as catalyst 0-2A.

Another portion of catalyst 0-2 was used in the preparation of a composition containing 0.5 part by weight antimony per 100 parts by weight catalyst 0-2, the antimony being employed as antimony tris(dipropyldithiocarbamate). In the preparation of this composition, 7.35 g of a solution of mineral oil and antimony tris(dipropyldithiocarbamate), the antimony concentration of the solution being 6.6 weight percent, was mixed with 92.65 ml of cyclohexane. The resulting solution was mixed with 100.0 g of catalyst 0-2, after which the mix- Table V

| | | | Yield | | |
|---|---|---|---|---|---|
| Catalyst | Conversion, Vol % of Feed | Catalyst:Oil Wt. Ratio | Gasoline, Vol % of Feed | Coke, Wt % of Feed | H₂, SCF/bbl Feed Converted |
| 0-1 | 75 | 7.4 | 54.8 | 16.4 | 800 |
| ATDP-1 | 75 | 7.3 | 57.0 | 13.9 | 500 |
| AT-1 | 75 | 8.0 | 58.7 | 15.1 | 590 | ture was dried with a hot air gun. Approximately 5 g of the dried composition, as a fixed bed in a quartz reactor, was heated at 900° F. (482° C.) for 30 minutes in a stream of nitrogen and then at 1100° F. (593° C.) for 1.5 hours in a stream of air. The catalyst composition was then cooled to room temperature (about 25° C.) in a stream of nitrogen. The resulting catalyst is herein designated as catalyst AT-2.

Yet another portion of catalyst 0-2 was used in the preparation of a composition containing 0.5 part by weight antimony per 100 parts by weight catalyst 0-2, the antimony being employed as antimony tris(O,O-dipropyl phosphorodithioate). In this preparation catalyst 0-2 was mixed with the calculated amount of a cyclohexane-mineral oil solution of antimony tris(O,O-dipropyl phosphorodithioate) containing 0.147 g antimony per ml solution.

The treated catalyst was dried with a heat lamp, after which the dried catalyst composition was transferred to a quartz reactor and heated to 900° F. (482° C.) as a bed fluidized with nitrogen, followed by regeneration at 1100° F. (593° C.) while fluidized with air. The catalyst composition was then preaged by processing it through ten cracking-regeneration cycles as a confined fluid bed in a quartz reactor using topped West Texas crude oil, described in Example I, as feed. Each cycle consisted of a nominal 0.5 -minute oil feed time to the catalyst fluidized with nitrogen during the cracking step conducted at about 950° F. (510° C.), followed by stripping of hydrocarbons from the system by fluidization of the catalyst for 3 to 5 minutes with nitrogen, followed by regeneration of the catalyst while heating to about 1150° F. (621° C.) for about 1 hour while fluidized with air. The catalyst was then cooled to room temperature (about 25° C.) while fluidized with nitrogen. Approximately 5 g of this preaged catalyst composition, as a fixed bed in a quartz reactor, was then heated at 900° F. (482° C.) for 30 minutes in a stream of nitrogen and then at 1100° F. (593° C.) for 1 hour in a stream of air. The catalyst composition was then cooled to room temperature (about 25° C.) in a stream of nitrogen. The resulting catalyst is herein designated as catalyst ATDP-2.

Although the procedures used in the preparation of catalysts 0-2A, ATDP-2, and AT-2 included some variations other than the use or lack of use of a particular modifying agent comprising antimony, these other variations were not such as would be expected to have a significant effect on the results obtained in the subsequent evaluation of the catalysts in cracking tests.

Catalysts 0-2A, ATDP-2, and AT-2 were evaluated in three series of cracking-regeneration cycles, in which the cracking step was conducted over a range of catalyst:oil ratios, using approximately 4–5 g of of catalyst as a fixed bed in a quartz reactor and employing metals-contaminated gas oil as the feedstock in the cracking step. In each cycle the cracking step was carried out at 900° F. (510° C.) and about atmospheric pressure for 0.5 minute, and the regeneration step was conducted at about 1100° F. (593° C.) and about atmospheric pressure for approximately 1 hour using air, the reactor being purged with nitrogen before and after each cracking step.

Properties of the gas oil used in this Example are shown in Table VII.

Table VII

| | |
|---|---|
| API gravity @ 60° F. (16° C.)[1] | 30.2 |
| BMCl[2] | 30.1 |
| Distillation, °F. (°C.)[3] | |
| 2% | 551 (288) |
| 10% | 608 (320) |
| 20% | 644 (340) |
| 30% | 675 (357) |
| 50% | 751 (399) |
| 70% | 857 (458) |
| 90% | 1007 (542) |
| Carbon residue, Rams, wt %[4] | 0.23 |
| Elemental analysis | |
| C, wt % | 88.3 |
| H, wt % | 11.8 |
| S, wt % | 0.20 |
| O, wt % | 0.075 |
| N, wt % | 0.08 |
| Ni, ppm | 0.25 |
| V, ppm | 9 |
| Molecular weight[5] | 328 |
| Pour point, °F. (°C.)[6] | 100 (38) |
| Kinematic viscosity, cSt[7] | |
| @ 130° F. (54° C.) | 62.47 |
| @ 210° F. (99° C.) | 39.26 |

[1]ASTM D 287-67
[2]V.A. Kalichevsky and K. A. Kobe, "Petroleum Refining with Chemicals", Elsevier Publishing Co., New York, N.Y. (1956), p. 56
[3]ASTM D 1160-61
[4]ASTM D 524-64
[5]By osmometry
[6]ASTM D 97-66
[7]ASTM D 445-65

Typical results of the cracking tests are summarized in Table VIII. The catalyst:oil weight ratios and yeilds of gasoline, coke, and hydrogen at a feed conversion level of about 75 volume percent were determined graphically from curves which were drawn to represent values for conversion and yields as determined experimentally at the various catalyst:oil ratios employed.

Table VIII

| | | | Yield | | |
|---|---|---|---|---|---|
| Catalyst | Conversion, Vol % of Feed | Catalyst:Oil Wt Ratio | Gasoline, vol % of Feed | Coke, Wt % of Feed | H$_2$, SCF/bbl Feed Converted |
| 0-2A | 75 | 5.6 | 56.25 | 6.8 | 380 |
| ATDP-2 | 75 | 6.1 | 61.5 | 6 | 225 |
| AT-2 | 74.6 | 5.8 | 61.84 | 6.1 | 292 |

Thus, in the cracking of gas oil using a fixed catalyst bed, even at a lower feed conversion level, the catalyst prepared by use of antimony tris(dipropyldithiocarbamate), when compared with the catalyst prepared by use of antimony tris(O,O-dipropyl phosphorodithioate), provided a higher gasoline yield and gave acceptably low levels of coke and hydrogen which were lower than those obtained with the catalyst to which no antimony had been added, at the same time exhibiting satisfactory catalyst activity.

Reasonable variation and modification are possible within the scope of the foregoing disclosure and the appended claims to the invention the essence of which is that a catalyst suitable for cracking hydrocarbon, e.g., a hydrocarbon oil, is treated with an antimony thiocarbamate to passivate contaminating metal, e.g., vanadium, iron and/or nickel, whenever it appears thereon; and that a method of passivating said metal as well as a method for cracking hydrocarbon, e.g., a hydrocarbon oil, with catalyst which has been so treated, have been set forth as described.

I claim:

1. A method for passivating a contaminating metal upon a hydrocarbon cracking catalyst, which comprises contacting said catalyst with an antimony thiocarbamate to add the same thereto.

2. A method according to claim 1 wherein the antimony compound is represented by the formula $(R_2NCX_2)_3Sb$, wherein each R is selected from the group consisting of hydrogen and monovalent hydrocarbyl radicals selected from the group consisting of alkyl, cycloalkyl, and aryl, and combinations thereof such as alkaryl, and aralkyl, the number of carbon atoms in each monovalent hydrocarbyl radical being within the range of 1 to about 18, and each X is selected from the group consisting of oxygen and sulfur, at least one X being sulfur.

3. A method according to claim 1 wherein the antimony compound is antimony tris(dipropyldithiocarbamate).

4. A cracking catalyst suitable for cracking a hydrocarbon which has been treated to passivate a contaminating metal whenever it appears thereon by incorporating with said catalyst, an antimony thiocarbamate.

5. A catalyst according to claim 4 wherein the antimony compound is represented by the formula $(R_2NCX_2)_3Sb$, wherein each R is selected from the group consisting of hydrogen and monovalent hydrocarbyl radicals selected from the group consisting of alkyl, cycloalkyl, and aryl, and combinations thereof such as alkaryl, and aralkyl, the number of carbon atoms in each monovalent hydrocarbyl radical being within the range of 1 to about 18, and each X is selected from the group consisting of oxygen and sulfur, at least one X being sulfur.

6. A catalyst according to claim 4 wherein the antimony compound is antimony tris(dipropyldithiocarbamate).

7. A process for cracking hydrocarbon oil employing an oil cracking catalyst, the effectiveness of which is reduced by contaminating metal deposits thereon from said hydrocarbon, which comprises passivating metal on said catalyst by adding to said catalyst an antimony thiocarbamate.

8. A process according to claim 7 wherein the antimony compound is represented by the formula $(R_2NCX_2)_3Sb$, wherein each R is selected from the group consisting of hydrogen and monovalent hydrocarbyl radicals selected from the group consisting of alkyl, cycloalkyl, and aryl, and combinations thereof such as alkaryl, and aralkyl, the number of carbon atoms in each monovalent hydrocarbyl radical being within the range of 1 to about 18, and each X is selected from the group consisting of oxygen and sulfur, at least one X being sulfur.

9. A process according to claim 7 wherein the antimony compound is antimony tris(dipropyldithiocarbamate).

10. A method according to claim 1 wherein the antimony compound is at least one selected from the following: antimony tris(thiocarbamate), antimony tris(dithiocarbamate), antimony tris(methylthiocarbamate), antimony tris(methyldithiocarbamate), antimony tris(dimethylthiocarbamate), antimony tris(diethyldithiocarbamate), antimony tris(dipropyldithiocarbamate), antimony tris(diisobutylthiocarbamate), antimony tris(hexyldithiocarbamate), antimony tris[bis(2-ethyloctyl)thiocarbamate], antimony tris(dioctadecyldithiocarbamate), antimony tris(dicyclohexyldithiocarbamate), antimony tris[bis(3-methylcyclohexyl)thiocarbamate], antimony tris[(cyclopentylmethyl)dithiocarbamate], antimony tris(diphenyldithiocarbamate), antimony tris(di-p-tolyldithiocarbamate), antimony tris(benzylthiocarbamate), antimony tris(butylphenyldithiocarbamate) and antimony tris(dodecylcyclohexylthiocarbamate).

11. A cracking catalyst according to claim 4 wherein the antimony compound is at least one compound selected from the following: antimony tris(thiocarbamate), antimony tris(dithiocarbamate), antimony tris(methylthiocarbamate), antimony tris(methyldithiocarbamate), antimony tris(dimethylthiocarbamate), antimony tris(diethyldithiocarbamate), antimony tris(dipropyldithiocarbamate), antimony tris(diisobutylthiocarbamate), antimony tris(hexyldithiocarbamate), antimony tris bis(2-ethyloctyl)thiocarbamate, antiomony tris (dioctadecyldithiocarbamate), antimony tris (dicyclohexyldithiocarbamate), antimony tris bis(3-methylcyclohexyl)thiocarbamate, antimony tris (cyclopentylmethyl)dithiocarbamate, antimony tris (diphenyldithiocarbamate), antimony tris(di-p-tolyldithiocarbamate), antimony tris(benzylthiocarbamate), antimony tris(butylphenyldithiocarbamate) and antimony tris(dodecylcyclohexylthiocarbamate).

12. A process according to claim 7 wherein the antimony compound is at least one compound selected from the following: antimony tris(thiocarbamate), antimony tris(dithiocarbamate), antimony tris(methylthiocarbamate), antimony tris-(methyldithiocarbamate), antimony tris (dimethylthiocarbamate), antimony tris-(diethyldithiocarbamate), antimony tris(dipropyldithiocarbamate), antimony tris (diisobutylthiocarbamate), antimony tris (hexyldithiocarbamate), antimony tris bis(2-ethyloctyl) thiocarbamate, antimony tris(dioctadecyldithiocarbamate), antimony tris(dicyclohexyldithiocarbamate), antimony tris bis(3-methylcyclohexyl)thiocarbamate, antimony tris (cyclopentylmethyl)dithiocarbamate, antimony tris (diphenyldithiocarbamate), antimony tris(di-p-tolyldithiocarbamate), antimony tris(benzylthiocarbamate), antimony tris(butylphenyldithiocarbamate) and antimony tris(dodecylcyclohexylthiocarbamate).

13. A method according to claim 1 wherein the hydrocarbon cracking catalyst is unused.

14. A method according to claim 1 wherein the hydrocarbon cracking catalyst has been used to crack a hydrocarbon.

15. A method according to claim 1 wherein the contaminating metal is at least one of iron, vanadium and nickel.

* * * * *